United States Patent Office 3,066,106
Patented Nov. 27, 1962

3,066,106
FOAMING PLASTICS BY GAS PERMEATION
William J. McMillan, Midland, and Keith R. Denslow, Coleman, Mich., assignors to The Dow Chemical Company, Midland, Mich., a corporation of Delaware
No Drawing. Filed Apr. 7, 1958, Ser. No. 726,652
1 Claim. (Cl. 260—2.5)

This invention concerns an improved method of making cellular bodies of organic thermoplastic materials, such as are often termed "plastic foams." The method of the invention permits expansion of an intimate mixture of a non-cellular thermoplastic resin and a "blowing agent" to form a cellular thermoplastic body having a greater volume, and a lower average density, than would theoretically be obtainable through the expanding action, by itself, of the blowing agent initially present. It involves an additional expanding operation above that attributable to the primary blowing agent.

It is known that plastic foams can be made by intimately incorporating a blowing agent within a body of a thermoplastic resin and thereafter bringing the body to a heat-plastifying or softening temperature and forming or expanding a gas, e.g., by heating, vaporizing or thermally decomposing the blowing agent, which expands the thermoplastic body to produce a foam composed for the most part of individually closed cells having thin walls of the thermoplastic resin. The blowing agent can be a solid chemical agent, such as ammonium carbonate, or any of a variety of organic azo compounds, that are decomposible to form a gas at the heat-plastifying temperature to which the resin is brought, or it can be a liquid such as water, pentane, hexane, etc., that becomes vaporized during the operation of heat-plastifying the resin body; or it can be a normally gaseous substance such as methyl chloride, carbon dioxide, dichlorodifluoromethane, trichloromonofluoromethane, monochlorotrifluoromethane, propylene, butylene, etc. that is capable of being dissolved in or otherwise intimately incorporated together with the non-cellular body of resin and thereafter vaporized or otherwise expanded to swell the mass and form the plastic foam.

A number of methods of incorporating blowing agents into thermoplastic organic bodies and of generating a gas or vapor from such agents to expand the bodies and form plastic foams are known. Cellular polystyrene is manufactured by dissolving methyl chloride in polystyrene at superatmospheric pressure, and usually at an elevated temperature of from 80° to 100° C., or thereabout, to form a flowable gel and extruding the gel into a zone of lower pressure so as to vaporize the methyl chloride and thereby simultaneously expand and cool the polystyrene to form the solid foam. It is known that in order to form a stable foam of good quality by this method, it is necessary that the gel be at a temperature below the critical temperature below the critical temperature of the methyl chloride immediately prior to being extruded and that the proportion of methyl chloride present in the gel be such as to be fully vaporized upon release of the pressure with resulting cooling (due to its heat of vaporization and expansion) of the resin to a temperature in the vicinity of, or below, the heat distortion temperature of the resin. Otherwise, the plastic foams thus formed often collapse, or become badly distorted, on standing. Even when properly prepared as just described, a solid foam of polystyrene shrinks or collapses upon being heated to above the heat distortion, or second order transition temperature of the polystyrene, e.g., to 100° C., or higher, for a substantial time.

It has now been found that a non-cellular thermoplastic resin mass containing a uniformly dispersed blowing agent can be brought to a heat-plastifying temperature (but below a temperature where the foam would be collapsed or the resin would be destroyed), and maintained at said heat-plastifying temperature for a time in excess of that required for the completed foaming of said primary blowing agent, in the presence of a gas having a permeability rate greater than that of the primary foaming agent, advantageously at substantially atmospheric or superatmospheric pressure up to several atmospheres, whereby said gas permeates the cell walls of the primary foamed resin mass and continues to expand the same up to a maximum wherein the partial pressure of said gas inside the foamed resin cells equals the pressure of said gas outside the foamed resin cells. This point can readily be determined since the foamed mass stops expanding at such time.

The preferred primary blowing agent is dichlorodifluoromethane. Other primary blowing agents which can be used include monochlorodifluoromethane, symmetrical dichlorotetrafluoroethane, and hydrocarbons having three or more carbon atoms, and the like, which boil below the heat-plastifying temperature of the thermoplastic resin, all of which have as additional physical properties no solvent effect or a poor solvent effect upon the organic thermoplastic to be foamed, and a permeability rate less than that of air or other secondary blowing agents through a membrane of the thermoplastic to be foamed.

The preferred secondary blowing agent is air, which has a permeability rate greater than monochlorodifluoromethane, dichlorodifluoromethane, dichlorotetrafluoroethane or other primary blowing agents. Other useful secondary blowing agents include helium, nitrogen, carbon dioxide, etc., all of which have a permeability rate greater than that of the primary blowing agent.

Any amorphous thermoplastic resin which can be foamed to give a stable foamed produce and does not crystallize upon heating to a heat-plastifying temperature can be used in the process of this invention. Such thermoplastics are well-known in the art and include the vinyl-aromatics, such as polymeric styrene, by which is meant polystyrene, interpolymers and copolymers of styrene with other monomers such as vinyltoluene and lightly cross-linked polymers and copolymers of styrene, advantageously with up to 0.5 weight percent of divinylbenzene; polyvinyltoluene; polydichlorostyrene; polymethylmethacrylate; etc.

In practice, any known method can be used for uniformly dispersing a blowing agent having little or no solvent action in the thermoplastic resin to be foamed, and foaming said resin mass by heating it to a heat-plastifying temperature. Thereafter the primary foamed product is kept heated at the heat-plastifying or softening temperature of the thermoplastic resin but below a temperature at which the foam would be collapsed or the resin would be thermally decomposed in the presence of a gas, e.g., air or other secondary blowing agents, as described above, which has a permeability rate greater than that of the primary foaming agent. The air, for example, thereby continues to permeate the cell walls of the foamed resin until the partial pressure of the air inside the thereby further expanded cell walls equals the pressure of air outside the cell walls at the heat-plastifying temperature. At this time, the foamed resin stops expanding and is cooled, or permitted to cool, to room temperature. The time required for such maximum expansion will vary with the type of thermoplastic resin, with the amount of primary blowing agent, with the heat-plastifying temperature, and with the secondary blowing agent used. It is within the province of this invention to use a plurality of such secondary foaming agents, either in combination or seriatim. If desired, further foaming beyond that due to expansion of the primary foaming agent can be stopped at any point short of the maximum expansion obtainable.

The preferred temperature range for heating non-crosslinked thermoplastic resins is 40° C. above the heat-plastifying or softening point, and for slightly crosslinked thermoplastic resins (0.001 to 0.5 percent crosslinked) is about 70° C. above such point. For polystyrene the preferred heating temperature is between 95° and 110° C., while for slightly crosslinked polystyrene (up to 0.5 weight percent of divinylbenzene or equivalent) it is between 130° and 160° C. For all foamed thermoplastics, the temperature of choice appears to be just below the point at which the primary foamed resin would be collapsed. This temperature can readily be determined by a simple trial.

In addition to air, other secondary foaming agents which have a permeability rate at heat-plastifying temperatures greater than that of the primary foaming agent can be used. These include helium, nitrogen, carbon dioxide, etc.

The following examples represent specific embodiments of the invention and the advantageous results derived therefrom. By "foamed volume," as used hereinafter, is meant the ratio of the final volume to the original volume of the material being foamed.

*Example 1*

Thermoplastic polystyrene granules containing 6.7 percent by weight of uniformly dispersed dichlorodifluoromethane were placed in a hot air oven at 100° C. at atmospheric pressure for various times with the following results:

| Oven Time, Hrs. | Foamed Volume | Theoretial Foamed Volume |
|---|---|---|
| 16.5 | 49 | 19 |
| 24.5 | 55 | |
| 41 | 58 | |

*Example 2*

A copolymer of 99.94 percent by weight of styrene and 0.06 percent divinylbenzene, containing 7.35 percent of uniformly dispersed dichlorodifluoromethane was placed in a hot air oven at 150° C. at atmospheric pressure for various times with the following results:

| Oven Time, Mins. | Foamed Volume | Theoretic Foamed Volume |
|---|---|---|
| 2 | 22.5 | 23.4 |
| 4 | 32 | |
| 6 | 37 | |
| 8 | 44 | |
| 10 | 46 | |
| 12 | 48 | |
| 14 | 49 | |
| 16 | 50 | |

What is claimed is:

A process for blowing a foamable thermoplastic organic resin mass of the group consisting of polystyrene and styrene-divinylbenzene copolymers containing up to 0.5 weight percent of divinylbenzene containing a uniformly dispersed primary blowing agent of the group consisting of monochlorodifluoromethane, dichlorodifluoromethane and symmetrical dichlorotetrafluoroethane which does not dissolve such resin, which method comprises heating such mass to a heat-plastifying, foam-forming temperature but below a temperature where the foam would be collapsed, and continuing to heat said foamed resin at said heat-plastifying temperature in the presence of an inert gas having a permeability rate greater than that of the primary blowing agent for a time in excess of that required for the primary blowing agent normally to attain maximum expansion whereby said gas permeates the cell walls of said foamed resin and further expands the foamed resin.

References Cited in the file of this patent

UNITED STATES PATENTS

| | | |
|---|---|---|
| 2,576,977 | Stober | Dec. 4, 1951 |
| 2,848,427 | Rubens | Aug. 19, 1958 |
| 2,848,428 | Rubens | Aug. 19, 1958 |
| 2,860,378 | Urchick | Nov. 18, 1958 |
| 2,878,194 | Rubens | Mar. 17, 1959 |

UNITED STATES PATENT OFFICE
CERTIFICATE OF CORRECTION

Patent No. 3,066,106            November 27, 1962

William J. McMillan et al.

It is hereby certified that error appears in the above numbered patent requiring correction and that the said Letters Patent should read as corrected below.

Column 4, line 15, for "blowing" read -- foaming --.

Signed and sealed this 28th day of May 1963.

(SEAL)
Attest:

ERNEST W. SWIDER
Attesting Officer

DAVID L. LADD
Commissioner of Patents